United States Patent [19]

Rangi et al.

[11] 4,082,479
[45] Apr. 4, 1978

[54] OVERSPEED SPOILERS FOR VERTICAL AXIS WIND TURBINE

[75] Inventors: Rajindar S. Rangi; Peter South, both of Ottawa, Canada

[73] Assignee: Canadian Patents and Development Limited, Ottawa, Canada

[21] Appl. No.: 707,205

[22] Filed: Jul. 21, 1976

[30] Foreign Application Priority Data

Sep. 25, 1975 Canada .................................. 236421

[51] Int. Cl.² .......................... F03D 3/06; F03D 7/06
[52] U.S. Cl. ................................ 416/23; 416/169 R; 416/227 A
[58] Field of Search .................. 416/23, 24, 44, 41, 416/227 A, 32, 169

[56] References Cited

U.S. PATENT DOCUMENTS

| | | | |
|---|---|---|---|
| 1,786,057 | 12/1930 | Fales | 416/148 |
| 2,076,520 | 4/1937 | Swanson | 416/132 |
| 2,148,921 | 2/1939 | Allen | 416/23 |
| 3,038,543 | 6/1962 | Davidson | 416/32 X |
| 3,348,806 | 10/1967 | Swiecicki | 416/23 |
| 3,812,812 | 5/1974 | Hurwitz | 416/169 X |
| 3,918,839 | 11/1975 | Blackwell et al. | 416/227 A X |

FOREIGN PATENT DOCUMENTS

| | | | |
|---|---|---|---|
| 990,595 | 9/1951 | France | 416/23 |
| 39,656 | 12/1936 | Netherlands | 416/23 |
| 114,637 | 7/1945 | Sweden | 416/41 |
| 206,160 | 7/1924 | United Kingdom | 416/169 |
| 252,461 | 5/1926 | United Kingdom | 416/87 |

*Primary Examiner*—Everette A. Powell, Jr.
*Attorney, Agent, or Firm*—James R. Hughes

[57] ABSTRACT

An overspeed spoiler for vertical axis wind turbines of the type having straight or curved airfoil blades attached to a vertical shaft formed by a relatively thin flat blade shaped spoiler element hinge mounted on the trailing edge, leading edge, or at a central position of a portion of the airfoil section with the element having two portions one of which is held flush or against a surface by spring means with a surface of the blade towards the turbine rotor axis and the other lies substantially parallel to the chordline of the airfoil, the weight and configuration of the element being such that a predetermined turbine rotor speed the element rotates against the spring force because of centrifugal action and takes up a position generally transverse to the air flow direction such as to cause much increased drag and control overspeeding of the rotor.

7 Claims, 8 Drawing Figures

MEASUREMENTS OF SPOILER EFFECTIVENESS ON 3-BLADE ROTORS

4,082,479

OVERSPEED SPOILERS FOR VERTICAL AXIS WIND TURBINE

This invention relates to vertical axis wind turbines and more particularly to an overspeed prevention and control device for these turbines.

The type of wind turbine toward which the present invention is directed was described in U.S. Pat. No. 1,835,018 issued Dec. 8, 1931 to G. J. M. Darrieus and entitled "Turbine Having Its Rotating Shaft Transverse to the Flow of the Current." Because of the present energy shortage problems, the use of the wind as an energy source is being examined again very seriously and the wind turbine described in the above patent has received increased attention. Although this device operates well, there are several attendant problems that must be solved before a practical device results. One of these is the problem of overspeeding of the rotor in high winds which could result in damage and even destruction of the device.

It is an object of the present invention to provide an overspeed controller and spoiler for vertical axis wind turbines that is light, simple, automatic and does not greatly affect the operation of the turbine airfoil sections at normal wind speeds.

This and other objects of the invention are achieved by an overspeed spoiler for vertical axis wind turbines of the type having straight or curved airfoil blades attached to a vertical shaft formed by a relatively thin flat blade shaped spoiler element hinge mounted on the trailing edge, leading edge, or at a central position of a portion of the airfoil section with the element having two portions one of which is held flush or against a surface by spring means with a surface of the blade towards the turbine rotor axis and the other lies substantially parallel to the chordline of the airfoil, the weight and configuration of the element being such that at a predetermined turbine rotor speed the element rotates against the spring force because of centrifugal action and takes up a position generally transverse to the air flow direction such as to cause much increased drag and control overspeeding of the rotor.

In the drawings which illustrate an embodiment of the invention,

Figure 1:
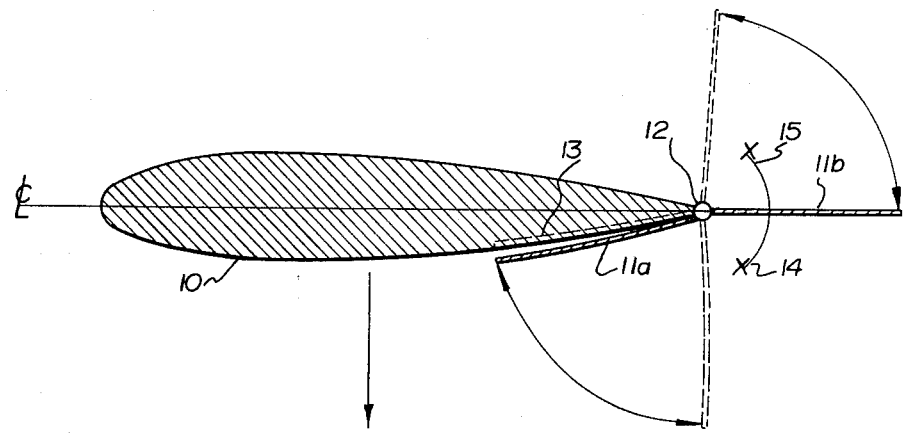
FIG. 1 is a cross-section of a rotor blade with spoiler element attached.

Referring to FIG. 1, a cross-section of a typical wind turbine rotor blade 10 is shown with the direction to the rotor axis being as shown. An overspeed spoiler 11 made up of two generally flat, plate-like portions 11a and 11b is mounted on a spring-loaded hinge or pivot 12 at the trailing edge of the rotor blade. At normal wind and rotor speeds, the spoiler maintains a position as shown (solid lines) with section 11a positioned close (or flush) to the surface of blade 10 on the side towards the rotor axis. An indentation 13 (dotted lines) could be formed in the surface of the blade so that the surface would be completely streamlined and undisturbed. Section 11b extends rearwardly lying substantially parallel to the chordline. The center of gravity of the overall spoiler in this closed position is at a point 14. It will be seen that this lies inwardly of the spoiler towards the rotor axis. At a predetermined rotor speed due to centrifugal action involved the spoiler rotates on the pivot against the spring to take up a new position with sections 11a and 11b generally normal to the air flow. The center of gravity has moved outwardly to a position 15. The open spoiler causes much increased drag slowing down the rotor until the speed has decreased to where the spoiler returns to the closed position.

Figure 2:
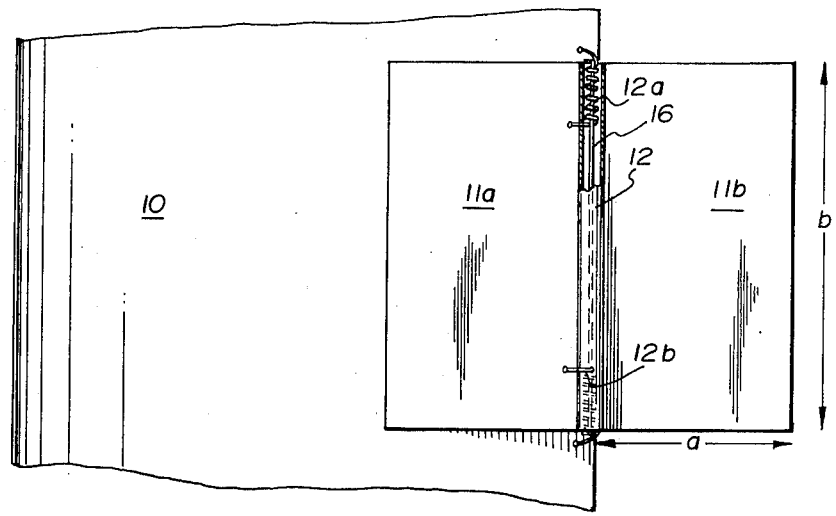
FIG. 2 is a plan view of the same.
Figure 3:
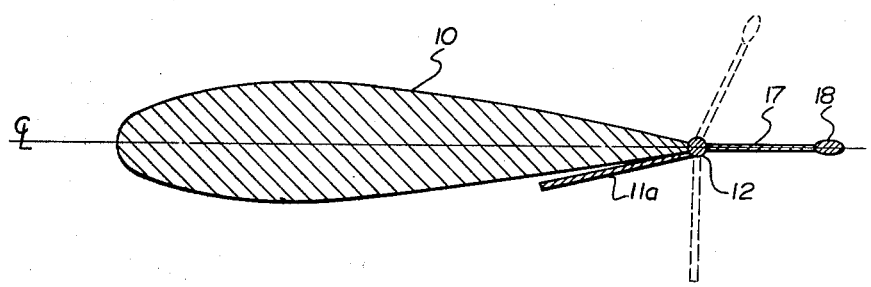
FIG. 3 is an alternative form of spoiler design.

FIG. 2 shows the device of FIG. 1 in plain view. The dimensions ($a$ and $b$) and the weight are suitably chosen as is the spring strength and preloading to provide actuation at the desired rotor speed. The spring loaded hinge or pivot 12 is formed by having the spoiler 11 mounted on rod 16 positioned at or adjacent the trailing edge of rotor blade 10. Springs 12a and 12b are fixed at their ends to the spoiler and to the rotor blade and are arranged such that there is a spring biasing force tending to hold the spoiler in the closed position i.e. with portion 11a close to or flush with the surface of rotor blade 10. Other types of spring would also be used e.g. a torsion bar attached at its ends to the spoiler and the rotor blade. The shape of the spoiler is important in that it must be such as to provide an offset center of gravity position at the closed position which must tend to move outwardly on increased centrifugal action. It is not necessary that portions 11a and 11b of spoiler 11 have equal areas or be of exactly similar geometrical configuration. Although either 11a or 11b might take the form of an arm 17 with a balance weight 18 attached (as shown in FIG. 3) it is considered that the form shown in FIGS. 1 and 2 will provide the best operation.

Figure 4:
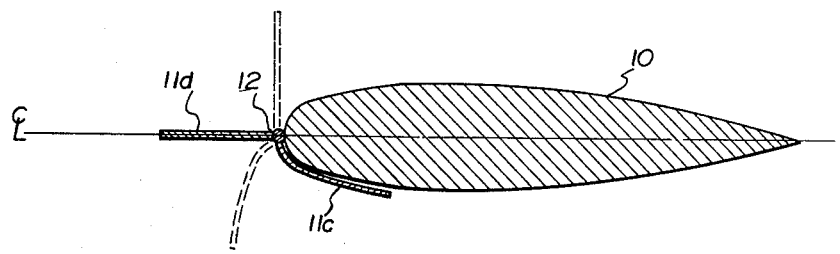
FIG. 4 shows a spoiler element attached to the leading edge of a rotor blade.

FIG. 4 is an alternative design with the spoiler 11 attached to the leading edge of rotor blade 10. In this case portion 11c will have a more pronounced curvature to conform with the contour of the leading edge. Portion 11d in the closed position extends forward along the chord-line of rotor blade 10. The operation is similar to that of the trailing edge version with the spoiler, at a designed rotor speed, rotating to an open position (dotted lines) with 11c and 11d generally transverse to the chord-line (and air flow).

Figure 5:
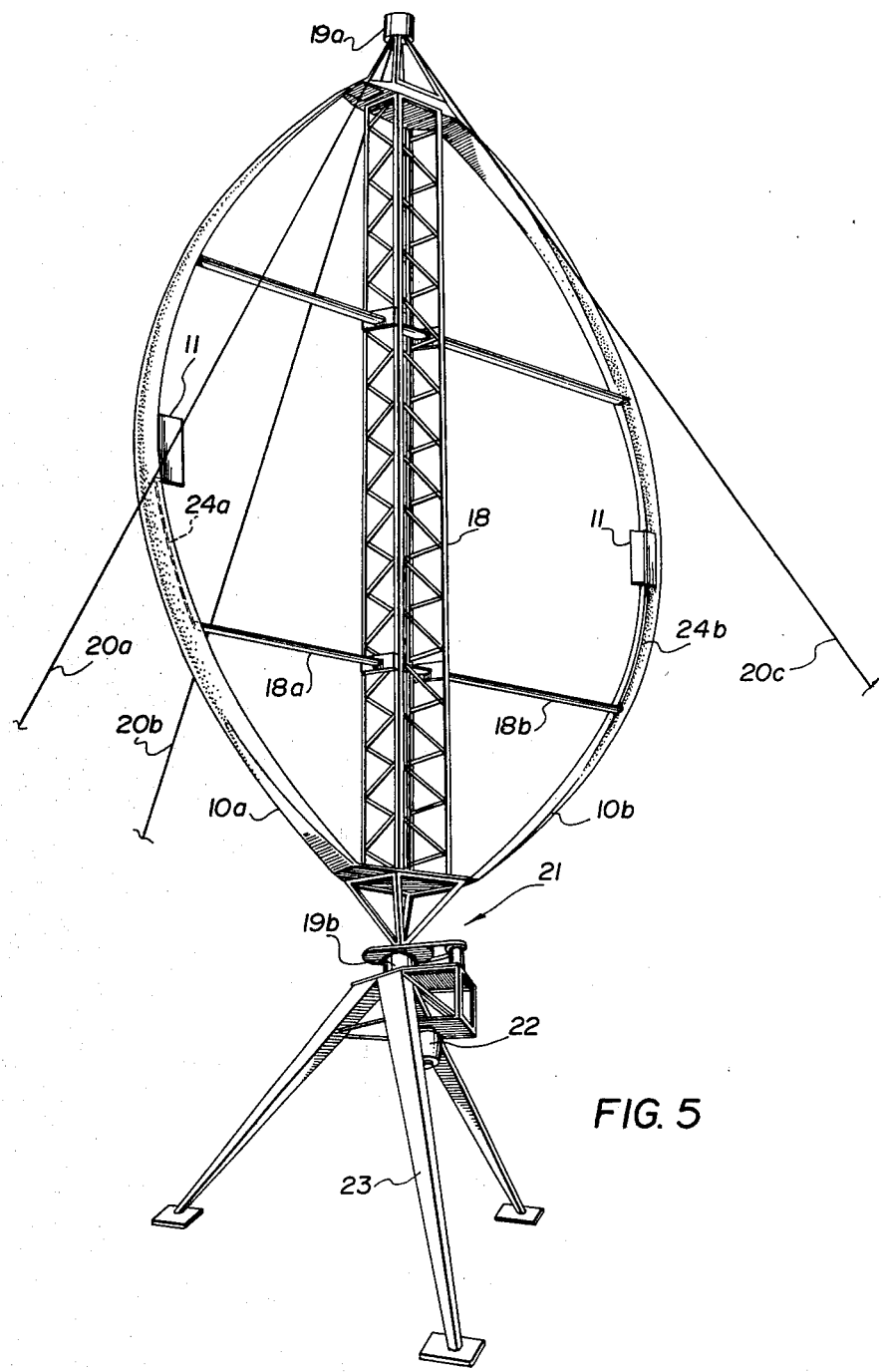
FIG. 5 is a view of a typical vertical axis wind turbine with overspeed spoilers mounted on the blades.

FIG. 5 illustrates a complete Darrieus rotor with spoilers 11 attached. The rotor is made up of two blades 10a and 10b mounted on a central rotor structure 18 in suitable bearings 19a and 19b with the structure held in position by guy wires 20a, 20b, and 20c. The theory of operation of this type of wind turbine has been known since the mid 1920's and is described in Darrieus' U.S. Pat. No. 1,835,018. Power generated by the turbine is transmitted by the rotor via drive means 21 to generator 22. The turbine is mounted on support means 23. The number of blades in the rotor need not be 2 e.g. 1, 3, 4, or 5 or more blades will operate and the present spoiler invention will apply as readily to these also. It may also be advisable for certain applications to have the spoilers operate simultaneously to prevent offsetting loads on the rotor and this would necessitate an interlinking mechanism. A mechanical interconnection arrangement 24a and 24b is shown connected to the two spoilers and passing along blades 10a and 10b and rotor supports 18a and 18b to connect at a center position.

Figure 6:
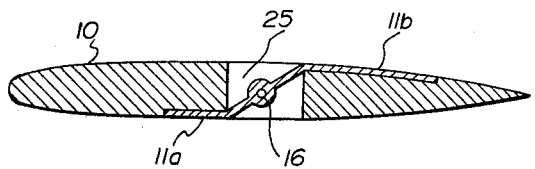
FIG. 6 shows a spoiler element mounted in a central position in the airfoil.

FIG. 6 shows an alternative mounting position of spoiler 11 (with portions 11a and 11b) hinge mounted on a rod 16 positioned in a slot or opening 25 in airfoil 10. The operation of this spoiler is generally similar to that of FIGS. 1 and 2 with the relative sizes of 11a and 11b being chosen to operate by centrifugal action against the spring 12a.

Figure 7:
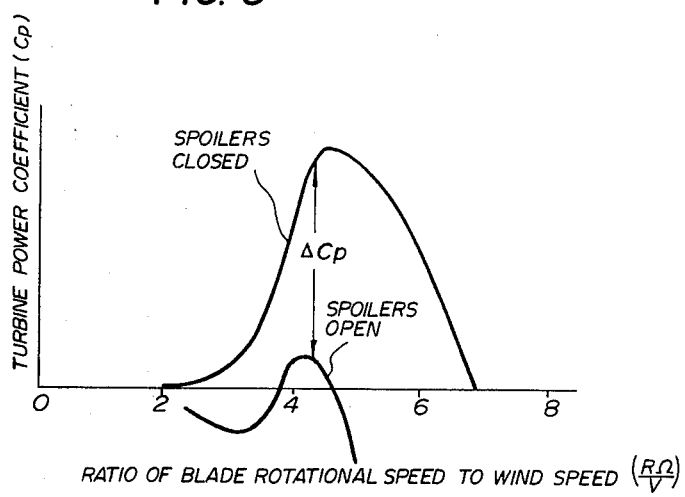
FIG. 7 is a graph showing performance of a wind turbine with spoilers closed and open.

FIG. 7 shows the performance of a vertical axis wind turbine displayed in standard coefficient form. The horizontal axis is the ratio of blade rotational speed at the equator to wind speed. R is the turbine equatorial radius, $\Omega$ is its rate of rotation, and V is the wind speed. The vertical axis is the turbine power coefficient $$C_P = \text{Power}/\tfrac{1}{2}\rho V^2 A$$

in which the numerator is actual shaft power delivered, and the denominator is the kinetic energy flow of air which passes through the rotor swept area. The quantity $\rho$ is the air density, V is again the wind speed, and A is the rotor swept area. The upper curve is a typical power coefficient curve for this type of wind turbine. The maximum value of $C_P$ is typically between 0.35 and 0.4. The lower curve is a corresponding curve with blade spoilers open. In the case shown, the spoilers were not sufficiently large to reduce the output power to zero over the entire range of blade speed ratio, but the reduction in power coefficient, designated as $\Delta C_P$, is a function of spoiler size, location, and rotational speed ratio.

Theoretical considerations suggest that the reduction in power coefficient, $\Delta C_P$, should be proportional to the ratio of spoiler area $A_s$ to swept area A, to the cube of the radius ratio $R_s/R$ and to the cube of the blade speed ratio $R\Omega/V$.

Figure 8:
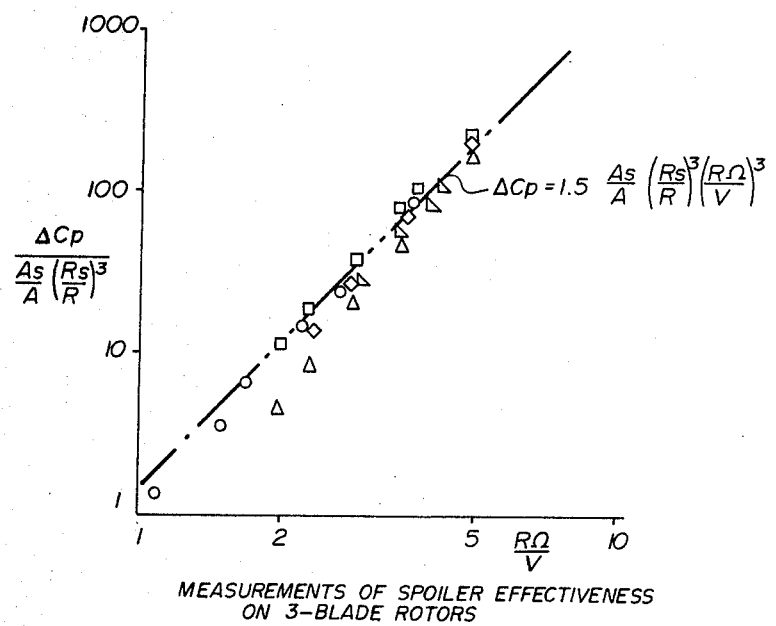
FIG. 8 is a graph showing experimental results of wind tunnel measurements with spoilers of different configurations.

FIG. 8, plotted on logarithmic scales, displays the results of numerous wind tunnel measurements with spoilers of many different configurations. In nearly all cases the theoretical expectation is closely confirmed, and the staight line drawn through the experimental points has the equation shown. From these results, the spoiler size and location can be chosen to satisfy a given design requirement.

In addition to the above application to curved rotor blades, a version of the device having straight arm blades has been proposed and the present invention could also be adapted for use on these.

We claim:

1. An overspeed spoiler for vertical axis wind turbines of the type having airfoil blades attached to and mounted outwardly of a vertical turbine rotor shaft comprising:
   (a) a relatively thin spoiler element hinge mounted at a position along the span-wise length of the airfoil blade, said element having two portions the first of which is held in a closed position generally flush against the surface of the airfoil blade towards the turbine rotor axis and the second extends outwardly from the hinge mounting and generally parallel to the center line of the said airfoil blade,
   (b) spring means attached to said element and to the airfoil blade and biased such as to hold the spoiler element in the closed position, and
   (c) the weight and configuration of the element and the spring strength being such that at a predetermined rotor speed the element rotates against the spring bias force because of centrifugal action and takes up an open position with both portions generally transverse to the air flow direction such as to cause much increased drag and provide control of overspeeding of the turbine rotor.

2. An overspeed spoiler for vertical axis wind turbines as in claim 1 wherein the spoiler element is mounted on the trailing edge of the airfoil blade.

3. An overspeed spoiler for vertical axis wind turbines as in claim 1 wherein the spoiler element is mounted on the leading edge of the airfoil blade.

4. An overspeed spoiler for vertical axis wind turbines as in claim 1 wherein the spoiler element is mounted at a central position in the airfoil blade.

5. An overspeed spoiler for vertical axis wind turbines as in claim 1 wherein the first portions of the spoiler element has a curved shape to conform to the surface shape of the airfoil blade and the second has a generally flat, straight shape such that the center of gravity of the complete spoiler element lies inwardly of the airfoil blade towards the rotor shaft when in the said closed position.

6. An overspeed spoiler as in claim 1 wherein the two portions have substantially equal areas.

7. An overspeed spoiler as in claim 1 wherein one of the portions of the spoiler element has a generally flat blade shape and the other is an extended arm with a balance weight attached.

* * * * *